Aug. 14, 1956

P. E. EDELMAN 2,759,061

PRESSURE SWITCH ACTUATOR

Filed March 21, 1952

INVENTOR

Philip E. Edelman.

United States Patent Office 2,759,061
Patented Aug. 14, 1956

2,759,061

PRESSURE SWITCH ACTUATOR

Philip E. Edelman, Los Angeles, Calif.

Application March 21, 1952, Serial No. 277,809

9 Claims. (Cl. 200—82)

The invention relates to improvements in pressure switches of the class used to open or close electrical switch contactors or serve as a relay, responsive to a predetermined range of pressure from a hydraulic or pneumatic system, or in any particular branch or part of said system. By the term hydraulic or pneumatic system, any suitable industrial, aircraft or missile arrangement of pressurized components suitable for use in the storage or transmission of power via a fluid or gaseous material under pressure is included. Normally open or normally closed switch contactors, one or more at a time, may be actuated by the device provided by this invention, characterized by the fact that one of said actions is initiated at one particular pressure as said system pressure increases and subsequently is terminated at another differential pressure within a pre-determined range, different and, for example, lower than said first initiating pressure by a definite amount. The actuated contactors or switch may be utilized for any purpose for which they are suitable, such as for a warning signal, a transfer of power, a shutting off of one branch of a system and cutting in of another, the actuation of an emergency pressure power system, and the like. A typical use of the device of the invention is found, for example, in an aircraft hydraulic system used for the actuation of various controls and devices carried in an airborne vehicle, wherein it is desired to normally utilize one branch of said system at one portion of a pre-determined range of pressures and to give effect to or transfer to another branch or emergency power unit of said system when a pre-set differential pressure or pressure lower than the starting pressure prevails. This affords automatic switching from a normal pneumatic or pressure system or an aircraft's regular hydraulic power system to an emergency or auxiliary power branch whenever the first branch fails or falls to a pre-set lower pressure from any cause whatsoever. The invention is suitable for uses within an exact calibrated range of differential pressures and is reliable during rapid cycling of pressures that are higher or lower than the pre-set range.

Figure 1:
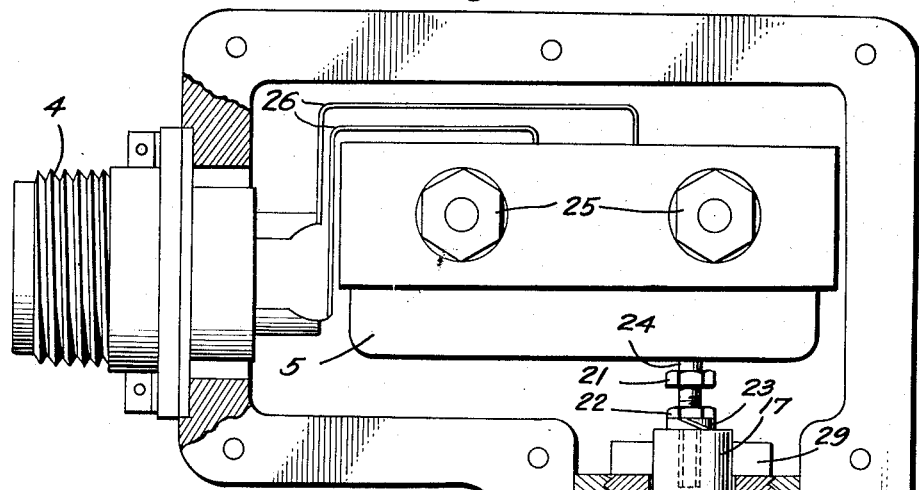
Figure 2:
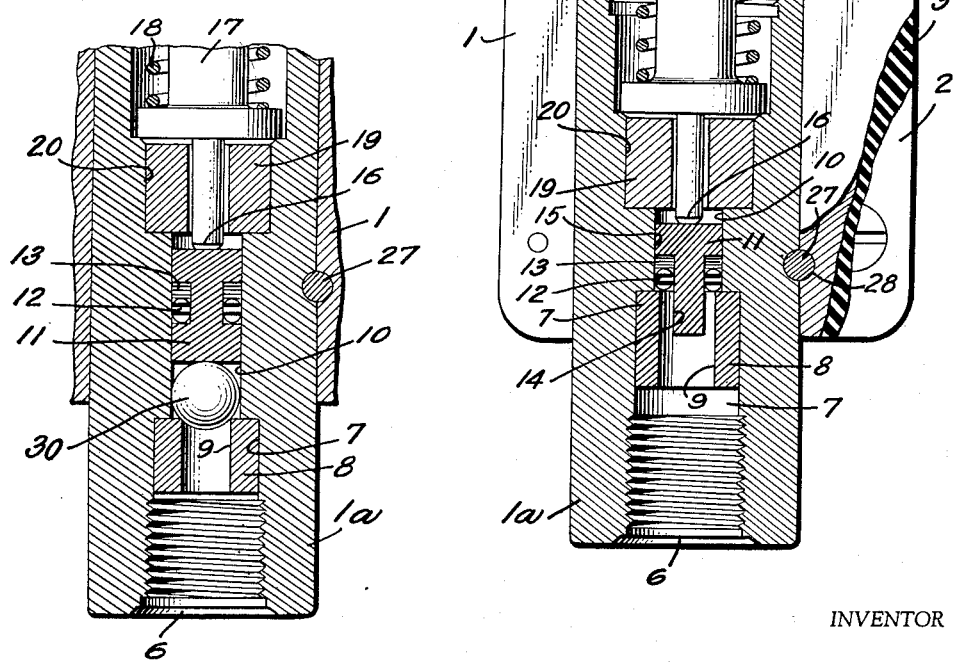

The invention is exemplified in the accompanying drawing in which Figure 1 is a vertical section showing of a suitable embodiment, and Figure 2 is a similar view of a part of Figure 1 modified for very high pressure service.

In the device characterized by the invention, there is provided a novel actuator combined with a snap-action switch to commence an action of the switch when a pre-determined pressure is reached, to hold this action thereafter and until the pressure subsequently drops to a lower value within a differential range from the first named pre-determined pressure, and to then restore the switch to its original position, whether normally "on" or "off." Similar reference numerals refer to similar elements.

A suitable housing 1 holds a switch 5 by fastening means 25. A cooperating dual pressure operator for switch 5 is assembled and defined in a tubular support member 1a which is located in housing 1 by a positioning pin 27 so that the actuating pin 24 of the switch 5 may be moved by switch engaging means 21 carried by plunger 17. Plunger 17 is slidably mounted in the member 1a so as to be movable by means of a piston element 11 in accordance with dual operating pressures that may be applied to element 11 on determined selected areas that define effective working areas, as hereafter described.

As best shown in Fig. 1, a calibrated bushing 8 is provided with a precision bore 9 of known area. The force applied to piston element 11 by fluid admitted via port 6 in member 1a is a product of the acting pressure and the effective working area of the piston element to which the pressure is permitted to be applied. The coacting elements which are presently to be described are assembled in coacting combination in member 1a so as to vary the effective working area on piston element 11 upon which dual operating pressures, applied via port 6, become effective. The calibrated bushing 8 precisely defines the initial operating pressure that can first move piston element 11 against the biasing spring force of spring 18 which holds plunger 17 against element 11. Piston element 11 then becomes restrained against collar 19 and stays there until the acting pressure drops to a predetermined lower value. This function is attained by disposing movable sealant means 12, 13 to seal piston element 11 in a bore 10 in member 1a so that the full area of bore 10 only becomes effective for the application of working pressure via port 6 after the sealant ring 12 is moved away from the calibrated bushing 8. The O ring 12 and its back-up ring 13 are thus put to a new use as a variable area sealant closure which coacts with the calibrated bushing 8 so as to give added utility to the known uses of elements 12 and 13 in contradistinction to known uses in fixed area sealing. This novel arrangement will presently be more fully described. It affords definitely determined dual working areas for application of pressures via port 6 upon piston element 11. Fluid leakage past piston element 11 is also prevented so that undesired counter-pressure does not build up on piston 11 and no fluid leaks to contact switch 5.

The species of the invention shown in Figure 2 is generically like that shown in Figure 1, but in order to accommodate very high operating pressure applied via port 6, the sealant members 12 and 13 are augmented by a movable sealant ball 30 that cannot extrude into the bore 9 of calibrated bushing 8. As in Figure 1, the sealant rings of Figure 2 also move with the piston element 11 and prevent fluid leakage past element 11. That portion of ball 30 which extends into the bore 9 of bushing 8 corresponds to the minor diameter 14 of element 11 in Figure 1 that extends into the bore 9. In Figure 2, when the ball 30 rests on the calibrated bushing 8, the effective working area for the switch operator is defined by the area of bore 9, but when the ball 30 is away from the bushing 8 the effective working area for the acting pressure applied via port 6 is defined by the larger area of the bore 10 of member 1a. Tubular operating member 1a is locked in housing 1, preferably by pin 27. Member 1a engages bushing 8 to afford a first calibrated fluid bore 9 which is defined in bushing 8. The larger bore 10 in member 1a defines a second and different calibrated bore of known area. Piston element 11 slides in bore 10. Sealant ring 12 closes one bore 9 from the other bore 10 when ring 12 rests on bushing 8 of Figure 1.

Member 1a defines a fluid admitting body so that pressure can be applied via its port 6. Bore 9 affords a first calibrated bore of known area to initiate the operation of switch 5 via piston element 11 and spring biased plunger 17. Element 11 is movably sealed in a second bore 10 in the body 1a so that this switch operating body carries two adjacent bores that are calibrated to have different areas. The piston element 11 of Figure 1 is in bore 10 but also extends at its portion 14 into bore 9. In Figure 2, a portion of ball 30 similarly extends into bore 9. In Figure 1 bore 10 may be closed from bore 9 by the combined seals 12 and 13 so that ring 12 may rest on bushing 8, while in Figure 2, the ball 30 may rest on bushing 8 for the stated purpose. The housing 1 which carries the operating body 1a also holds switch 5 in operating relation to be adjustable with respect to plunger 17 and its switch operator 21. The hollow operating body 1a is adjustably closed at one end by threaded nut-cap 29 and also carries a stop collar 19 in one of its bores 20. Collar 19 limits the motion of piston element 11. The detailed coacting combination of the aforesaid elements will next be more particularly described.

The volume of fluid admitted via port 6 varies in bore 10 more than it does in bore 9 as piston element 11 moves in bore 10, but none of the fluid can escape to the stop collar 19. The novel arrangement shown avoids fluid trapping that could otherwise interfere with the intended operation.

A suitable housing 1 is provided with a removable cover 2 sealed by means of a gasket or equivalent hermetic sealing medium 3. A sealed electrical connecting socket 4 is carried by the housing 1 and connects with a suitable snap-action electrical switch 5. This switch 5 may have any desired number of contactors that are either normally closed or normally open, as the circumstance of the intended application may require. Such switches are well known and require no further description for the information of persons skilled in this art.

The housing 1 is provided with a threaded bore or entrance port 6 for connection to either a hydraulic or a pneumatic pressure system or any desired branch or section thereof. This bore extends into a passageway 7 into which there is force-fitted a suitable calibrated tube member 8 provided with a pre-determined inside diameter 9 of known area, pre-set according to a pre-determined pressure at which it is desired to commence the action upon switch 5. Interchanged duplicates of member 8, alike except as to the calibrated area of its bore 9 may be similarly shrink-fitted into passageway 7 when a different pre-calibrated starting area is desired. Adjacent to member 8 there is an extended smooth bore 10 in which a closely-fitted member 11 is slidable and also sealed by O ring sealant member 12 and its cooperating back-up ring 13 in customary manner.

Slide member 11 has a minor diameter 14 which engages the inner diameter or surface of sealant element 12, and has a major diameter 15 which fits in the bore 10 so that element 11 can be moved in either direction therein. Sealant element 12 is arranged to rest against member 8 to seal bore 9 thereof to that a pre-set value of pressure is required to crack or move same away therefrom. The initiating force to crack the contact of element 12 on member 8 and move same away therefrom is precisely dependent on the applied pressure acting on a pre-set area, as aforesaid. Sliding member 11 is restrained against a pin portion 16 on plunger 17 which is urged against element 11 by a calibrated spring 18 provided with an adjusting and threaded cap 29. Once cap 29 is pre-set to provide a desired cracking pressure setting, as aforesaid, it may be locked against change by staking or peening cap 29 in place. The area of both bores 9 and 10 are exactly pre-determined and known. The force that is effective upon slide member 11 when sealant element 12 rests against member 8 is a direct function of the pressure applied via bore 9, but as soon as the seal between member 12, carried by element 11, is cracked, or ever so slightly moved away from member 8, the effective area upon which the actuating pressure is effective becomes that area which is defined by bore 10, whereupon member 11 is moved up against stop collar 19 which tightly engages retaining bore portion 20 that is provided in housing 1a. Collar 19 thus limits the travel of member 11 in bore 10, as the applied pressure increases. This arrangement of the co-acting elements affords a precise range of calibration because the spring 18 has a limited amount of deflection determined by collar 19. By the term "shrinking" of collar 19 in retaining bore portion 20, it will be understood that this means the customary process of freezing element 19 and warming bore portion 20 to permit insertion of collar 19 therein, whereby collar 19 thereafter expands tightly in bore 20 when the temperatures thereof become substantially equalized. To facilitate assembly, portion 1a of housing 1 may similarly be fabricated as a cylinder element 1a that is similarly shrink-fitted into housing 1, and subsequently becomes a permanent part thereof.

To further facilitate a precise pre-set adjustment for initiating and determining the pressure at which switch 5 may be differentially actuated, an adjusting screw member 21 is carried by plunger 17 and may be locked thereon in a pre-set position by means of nut 22 and lockwasher 23. Switch 5 is carried in and held against housing 1 in customary manner via positioning screws 25. Socket 4 may be connected to any suitable electrical circuit to be operated by switch 5 via connecting conductors 26. Once the stated device provided by this coacting combination of elements, aforesaid, is pre-set for a desired differential range of pressure response, the cover 2 may be sealed upon housing 1 via its sealant means 3. To further insure the exact positioning of cylinder portion 1a in housing 1, an auxiliary positioning pin 27 may be driven therebetween in a suitable connecting hole 28.

Member 12, cooperating with element 8, serves as a valving means to control the effective force acting upon piston member 11, firstly via the calibrated area of the bore 9 that it initially covers, and secondly via the calibrated area of member 11 that is exposed to the actuating pressure after element 11 is cracked away from member 8.

Once the acting pressure applied via threaded bore or port 6 cracks element 12 away from member 8, it acts upon the calibrated area of piston 11 in bore 10 and pushes member 11 against stop collar 19 where it is held as the pressure increases or decreases, and continuing until the pressure applied via port 6 drops to a lower value, or differential pressure with reference to the initiating pressure, that has a value acting over the calibrated area of piston 11 in bore 10 which precisely opposes the force of spring 18 in amount that re-seats sealant member 12 against element 8, whereupon screw member 21 pulls away from actuating pin 24 of switch 5 and resets same to its starting position. The combined means of this coacting combination, aforesaid, thus definitely gives effect to the desired responsive action of switch 5 within a preset calibrated differential applied pressure range directed via port 6. The combined elements are at all times sealed against internal or external leakage because member 12 serves as a sealant element at all times that pressure is applied thereto, either while element 12 rests against member 8 or while it slides in bore 10 or rests against the surface of bore 10. The pressurized medium applied via port 6 does not pass beyond the backup ring 13 which cooperates with member 12 carried on element 11. The friction error due to member 12 is thus minimized, and the device of the invention is found to repeat its function accurately during cycling of applied pressures via port 6, either with increasing or decreasing pressures.

Any desired differential pre-set calibration ranges for the combination may be attained. In some determined calibrations it suffices to reset the calibrating nut-cap 29 to adjust spring 18. For other ranges, an interchanged member 8 with different bore 9 may be used. If necessary an interchanged spring 18 characterized by a different spring rate or deflection per value of applied force may be utilized.

A wide range of pre-determined and pre-set calibrations is thus made available for any suitable purpose at both high and low pressure settings and definite differentials related to each range of settings.

The modification of Figure 2 is suitable for use in certain very high pressure applications of the invention. An additional ball or poppet element 30 augments the valving action. Ball 30 serves as a valve element seated against member 8 until cracked away therefrom by pressure applied via port 6 and continuing in the same manner as for Figure 1, up to the re-seating point, whereupon switch 5 is similarly reset to its initial position. For use at low pressures and differentials the diameter of the bore 10 and its cooperating elements 11, 12, 13 may be appropriately increased, or the spring 18 may be weakened, or both, and as desired. The invention provides a pressure switch actuator that functions accurately in any position and under severe service conditions of ambient temperatures, vibrations, accelerations and pressure cycling.

The resilient sealant ring 12 seals the movable piston 11 in the bore 10 and also functions as a valving element when it bears upon or is cracked away from tube member 8. The bore 10 affords a fluid compartment which is closed from seat 8 by ring 12 until applied pressure cracks it away therefrom and into bore 10, whereupon the larger diameter of bore 10 measures the effective working area upon which the fluid pressure is applied.

As shown best in Figure 1, different working areas of two effective surfaces of the means to actuate the switch 5 are thus adjusted via the action of elastic ring 12 carried on piston pin 11, because ring 12 seals bore 9 of seat member 8 when it rests against it. The diameter of bore 9 then affords the effective working area for the application of fluid pressure. When this pressure cracks ring 12 away from tube 8 the diameter of bore 10 defines the effective working area upon which fluid pressure is applied. This affords a snap-action response to increasing pressure that is applied via port 6. The term "fluid" includes any suitable liquid or gaseous material thru which pressure may be applied to port 6, as for example, hydraulic fluid or compressed gas.

Elements 11, 12 and 13 are moveable together in bore 10 only over a limited distance. Electrical switch 5 is held actuated while ring 12 is fluid-free from tube 8 but becomes re-set when ring 12 reseats thereon, as the applied pressure via port 6 falls. The operating cycle may be repeated as the applied pressure changes, but false operation is prevented by the damping action of elements 11, 12 and 13 in the bore 10. The invention provides a device that is responsive to changes of pressure over a pre-determined differential range, regardless of the rate at which the pressure varies or cycles, so that switch 5 is reliably operated within pre-set amounts of the pressure applied via port 6.

I claim:

1. A pressure switch actuator comprising a housing with means to hold a switch and a cooperating dual pressure operator to actuate said switch, said operator comprising a hollow supporting body including in co-acting combination, a plunger, switch engaging means on the plunger, a piston element contacting said plunger, a spring pressing the plunger against the piston element, sealant means carried on said piston element to move therewith, a calibrated bushing having a fixed area bore and normally engaging said sealant means along the rim of the bore to close its fixed area, a port to admit fluid and hold same in said bushing until a pre-determined pressure is reached to disengage said sealant means from said bushing, and a larger bore adjacent to said fixed area bore to retain said fluid sealed by said sealant means until the fluid is returned into the bushing at a different pre-determined pressure that is dependent upon the area of said larger bore.

2. A device of the class set forth comprising a switch operating body provided with fluid admitting means and two adjacent calibrated bores of pre-determined different areas, a piston element in one of the bores and extending into the other of said bores, combined sealant and closure means on the piston element to seal said piston element in its bore and also at an area between said two bores, a plunger in the body and pressing upon said piston element, a spring in the body to hold the plunger on the piston element and a switch actuator adjustably mounted on said plunger whereby the operation of said actuator is respectively limited in accordance with said pre-determined different areas of the bores.

3. A device of the class set forth comprising a body provided with means to admit a fluid, two adjacent bores of different areas in said body, a piston element in one bore and extending into the other bore, a sealant ring disposed to engage the said element, also one bore and the end of the other bore, a spring in said body, and a switch operating plunger pressed upon said piston element and movable against the spring only in accordance with the pressure of said fluid over a range determined by said different bore areas.

4. In a device of the class set forth, a housing for a switch and having an operating body held by the housing, a fluid port for said body, two bushings held in the body, a bore extending between the bushings, a piston in said bore, a spring in the body, a switch plunger pressed against one end of said piston by the spring, and a sealant member held intermediate between said piston and one of said bushings to limit the motion of the piston according to a range of pressure of the fluid admitted by said port.

5. In a switch actuating device, a housing including an operating body, a fluid port for the body, a calibrated tube member and a stop collar in said body, a bore in the body between the collar and the tube member, a piston in said bore, a spring in the body, a switch operating plunger pressed against said piston by the spring and resting on said collar, and sealing means held between the calibrated tube member and said piston when said plunger rests on the collar, and unsealed from said tube member when said piston rests against said stop collar.

6. A pressure switch actuator comprising a housing with means to hold a switch and a cooperating dual pressure switch operator, said operator comprising a hollow member having a port for applying operating pressure and connecting bores consecutively supporting, in co-acting combination, a calibrated bushing defining an orifice of predetermined area, a sealant element seatable on this bushing to enter and close its orifice, a movable piston, provided with a working area greater than that of said orifice, engaging said sealant element against the bushing, a collar to limit the motion of the piston, a switch actuating plunger contacting and movable by the piston, and a spring placed to hold this plunger against the piston, whereby the spring and the orifice determine the first pressure to move the piston and the collar then stops the piston until the applied pressure drops to a lower limit which is jointly determined by the working area of the piston and the same spring.

7. A pressure switch actuator comprising a housing to hold a switch and a cooperating switch operator for dual pressure service, said operator comprising a hollow member having a port for applying operating pressure and aligned bores supporting, in co-acting combination, a bushing with an orifice of predetermined area, a closure element seatable on this bushing to enter and seal its orifice, a movable piston of greater working area than that in the orifice, said piston engaging the sealant element and pressing it against the bushing, means to limit the motion of the piston, a switch actuating plunger movable by the piston, and an adjustable spring to hold the plunger on the piston.

8. A device of the class set forth comprising a fluid-admitting body, a bushing defining a calibrated bore held in the body, a connecting bore in the body of larger size than the calibrated bore, a piston element in the larger bore and extending into the calibrated bore, a sealing ring on the piston element disposed to be movable in the larger bore and also seatable to close the calibrated bore, a switch actuating plunger contacting the piston element, a spring to hold the plunger against the said element, and means to limit the motion of the plunger in said body, whereby said switch actuating plunger commences operation at a fluid pressure determined by the calibrated bore and the spring and continues over a range to a lower pressure determined by the same spring and the said bore of larger size in which the sealing ring is moved.

9. A device of the class set forth comprising a hollow switch operating body provided with means to admit a pressure source to a piston movable in said body, a cylinder in the body for the piston, a calibrated bushing having an orifice area smaller than that of the cylinder and connecting therewith, a sealing element held by the piston to be seatable at the rim of said bushing's orifice, a stop collar partially closing said cylinder, a switch actuating plunger extending thru said collar to engage the piston, means on the plunger to seat on said collar, a spring bushing held in said body, and a spring held stressed against the spring bushing and the plunger so that the piston can press said sealing element to close the calibrated bushing's orifice.

References Cited in the file of this patent

UNITED STATES PATENTS

| | | |
|---|---|---|
| 2,188,948 | Huebner | Feb. 6, 1940 |
| 2,244,007 | Harrington | June 3, 1941 |
| 2,461,692 | Malir | Feb. 15, 1949 |
| 2,492,261 | Bordelon | Dec. 27, 1949 |
| 2,500,457 | Hess | Mar. 14, 1950 |
| 2,507,065 | Trautman | May 9, 1950 |
| 2,616,008 | Baker | Oct. 28, 1952 |